(12) United States Patent
Lee et al.

(10) Patent No.: US 12,300,797 B2
(45) Date of Patent: May 13, 2025

(54) BATTERY MODULE, METHOD FOR MANUFACTURING THE SAME AND BATTERY PACK

(71) Applicant: LG Energy Solution, Ltd., Seoul (KR)

(72) Inventors: Youngho Lee, Daejeon (KR); Junkyu Park, Daejeon (KR); Jae Jung Seol, Daejeon (KR); Namhoon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 693 days.

(21) Appl. No.: 17/615,351

(22) PCT Filed: Nov. 23, 2020

(86) PCT No.: PCT/KR2020/016576
§ 371 (c)(1),
(2) Date: Nov. 30, 2021

(87) PCT Pub. No.: WO2021/107529
PCT Pub. Date: Jun. 3, 2021

(65) Prior Publication Data
US 2022/0223938 A1    Jul. 14, 2022

(30) Foreign Application Priority Data

Nov. 25, 2019  (KR) .................. 10-2019-0152655
Nov. 20, 2020  (KR) .................. 10-2020-0157074

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/6551* (2015.04); *H01M 50/211* (2021.01); *H01M 50/258* (2021.01)

(58) Field of Classification Search
CPC ............ H01M 10/653; H01M 10/613; H01M 10/6551; H01M 50/21; H01M 50/258
(Continued)

(56) References Cited

U.S. PATENT DOCUMENTS 10,615,470 B2   4/2020  Park et al.
2016/0197386 A1  7/2016  Moon et al.
(Continued)

FOREIGN PATENT DOCUMENTS

CN   207217718 U   4/2018
CN   108475831 A   8/2018
(Continued)

OTHER PUBLICATIONS

Extended European Search Report for Application No. 20892371.4 dated Jul. 4, 2022. 7 pgs.
(Continued)

*Primary Examiner* — Ekandra S. Miller-Cruz
*Assistant Examiner* — Kevin Nguyen
(74) *Attorney, Agent, or Firm* — Lerner David LLP

(57) ABSTRACT

A battery module according to one embodiment of the present disclosure includes: a battery cell stack in which a plurality of battery cells are stacked, a first frame member that houses the battery cell stack and has an open upper part, a second frame member that covers the battery cell stack at the open upper part of the first frame member, and a thermally conductive resin layer that is located between the first frame member and the battery cell stack, wherein the thermally conductive resin layer includes a plurality of coating lines each extending in a direction in which the plurality of battery cells are stacked.

20 Claims, 11 Drawing Sheets

(51) Int. Cl.
*H01M 10/6551* (2014.01)
*H01M 50/211* (2021.01)
*H01M 50/258* (2021.01)

(58) Field of Classification Search
USPC .......................................................... 429/120
See application file for complete search history.

(56) References Cited

U.S. PATENT DOCUMENTS

| | | | |
|---|---|---|---|
| 2016/0226115 A1* | 8/2016 | Wakida | H01M 10/658 |
| 2018/0183117 A1 | 6/2018 | Cho et al. | |
| 2018/0191041 A1 | 7/2018 | Jeon et al. | |
| 2018/0358666 A1* | 12/2018 | Siering | H01M 50/24 |
| 2019/0081373 A1 | 3/2019 | Liu et al. | |
| 2019/0198952 A1 | 6/2019 | Choi et al. | |
| 2020/0274213 A1 | 8/2020 | Cho et al. | |
| 2020/0411924 A1 | 12/2020 | Yun | |
| 2021/0028423 A1 | 1/2021 | Shin et al. | |

FOREIGN PATENT DOCUMENTS

| | | |
|---|---|---|
| EP | 3379638 A1 | 9/2018 |
| JP | 2015207541 A | 11/2015 |
| JP | 2017054766 A | 3/2017 |
| JP | 2019021640 A | 2/2019 |
| JP | 2019508870 A | 3/2019 |
| JP | 2019139879 A | 8/2019 |
| KR | 100709200 B1 | 4/2007 |
| KR | 101636378 B1 | 7/2016 |
| KR | 101649613 B1 | 8/2016 |
| KR | 20160105355 A | 9/2016 |
| KR | 20180080614 A | 7/2018 |
| KR | 20180112630 A | 10/2018 |
| KR | 20190078521 A | 7/2019 |
| KR | 20190107900 A | 9/2019 |
| WO | 2013084973 A1 | 6/2013 |
| WO | 2019082751 A1 | 5/2019 |
| WO | 2022085997 A1 | 4/2022 |

OTHER PUBLICATIONS

International Search Report for PCT/KR2020/016576 dated Mar. 4, 2021. 2 pgs.

Search Report dated Aug. 7, 2023 from the Office Action for Chinese Application No. 202080032832.5 issued Aug. 11, 2023, 2 pages.

* cited by examiner

[FIG. 1]
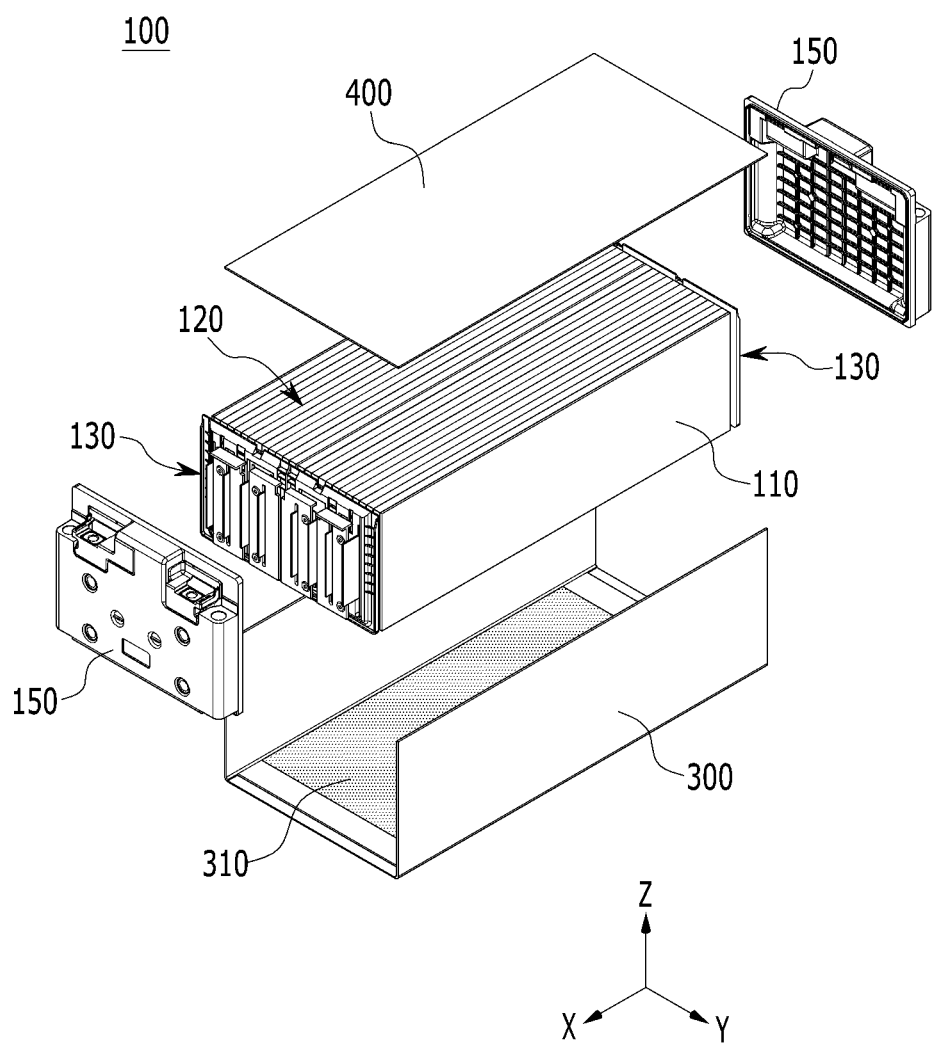

[FIG. 2]
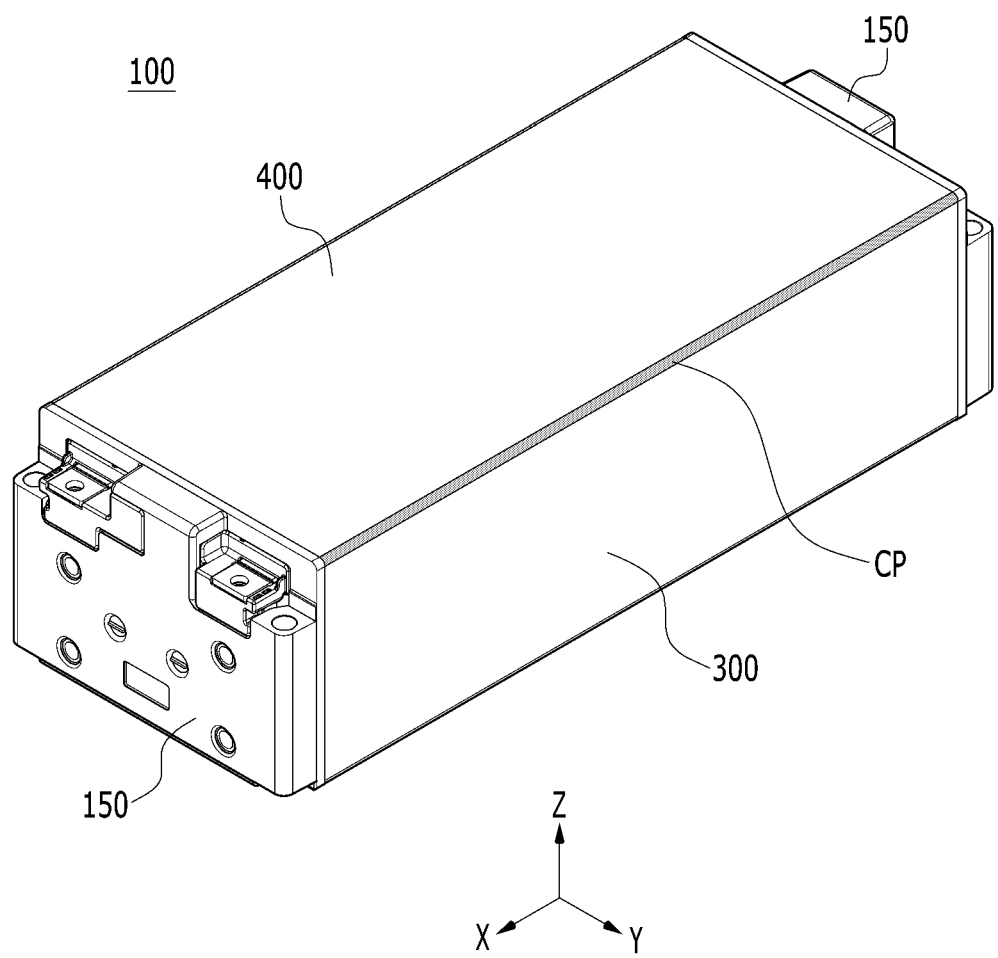

[FIG. 3]
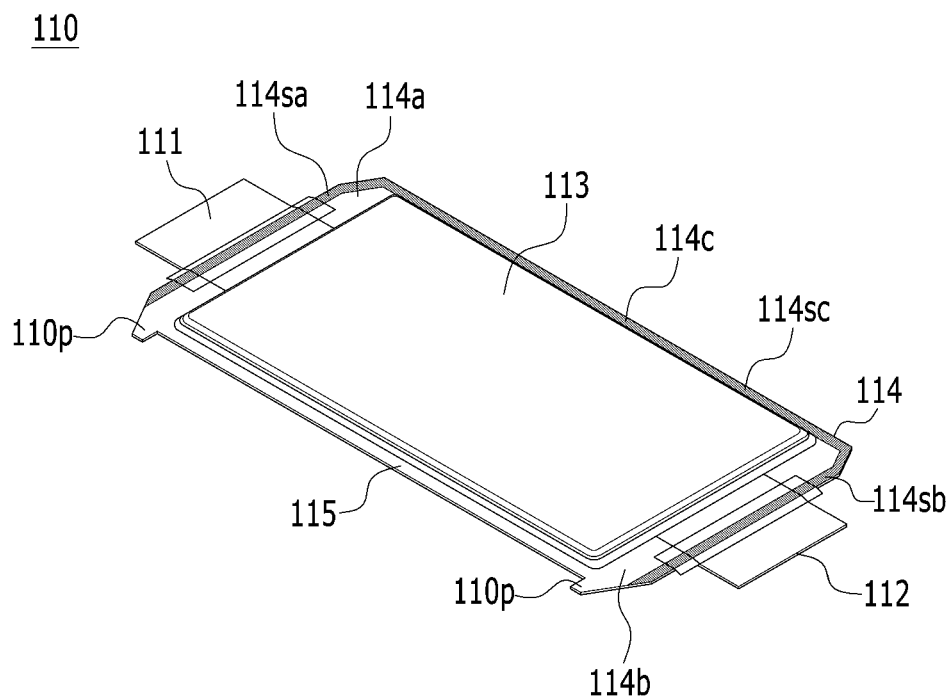

[FIG. 4]
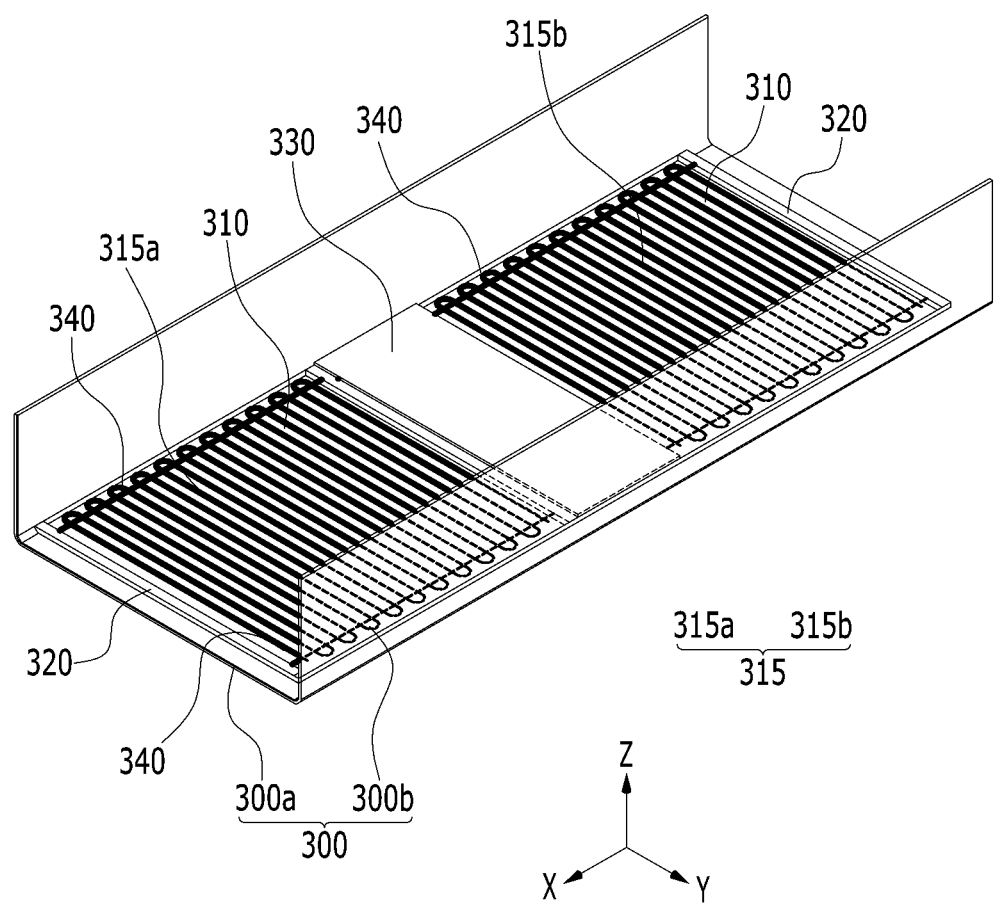

[FIG. 5]
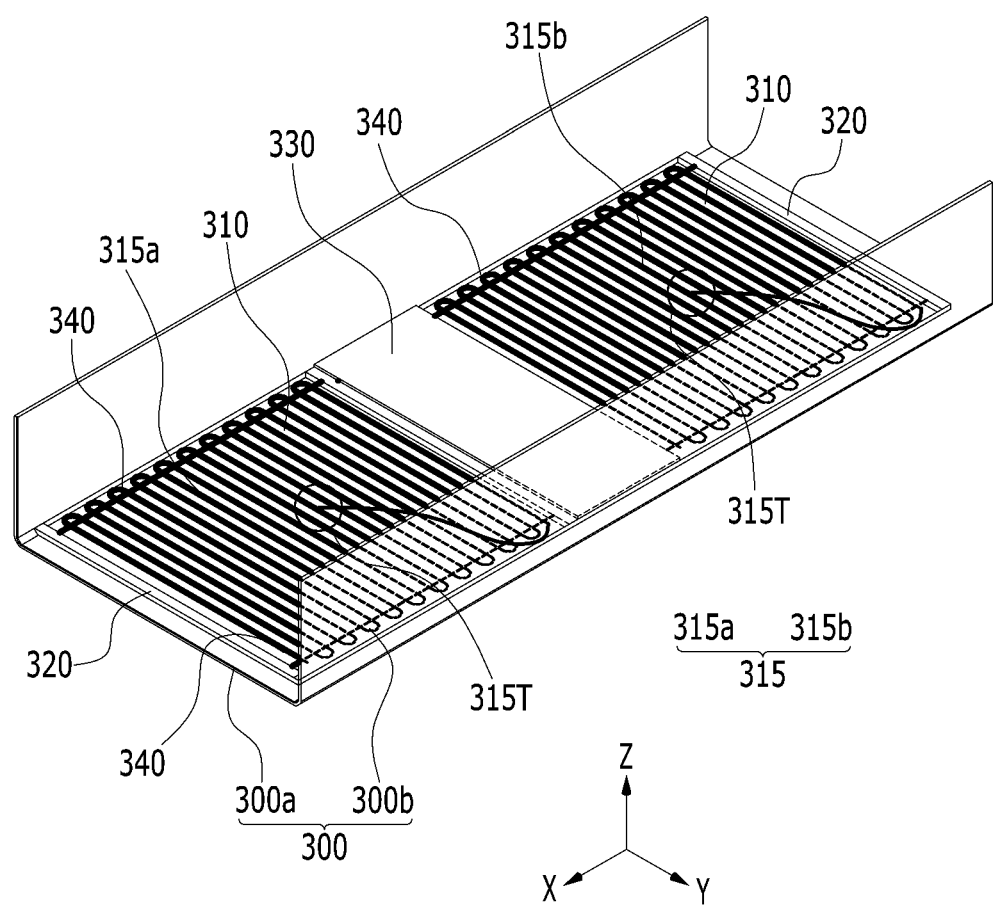

[FIG. 6]
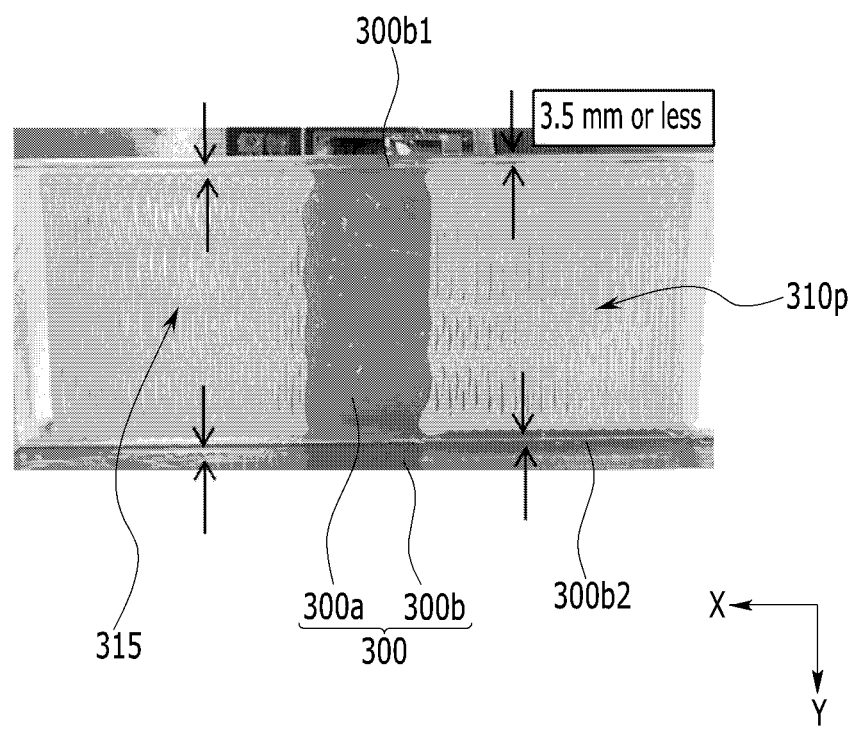

[FIG. 7]
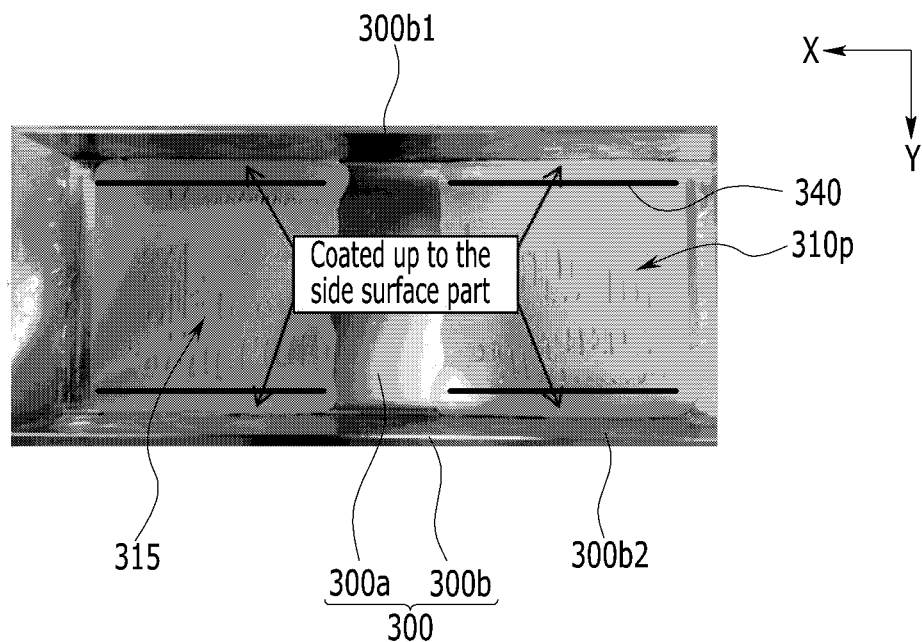

[FIG. 8]
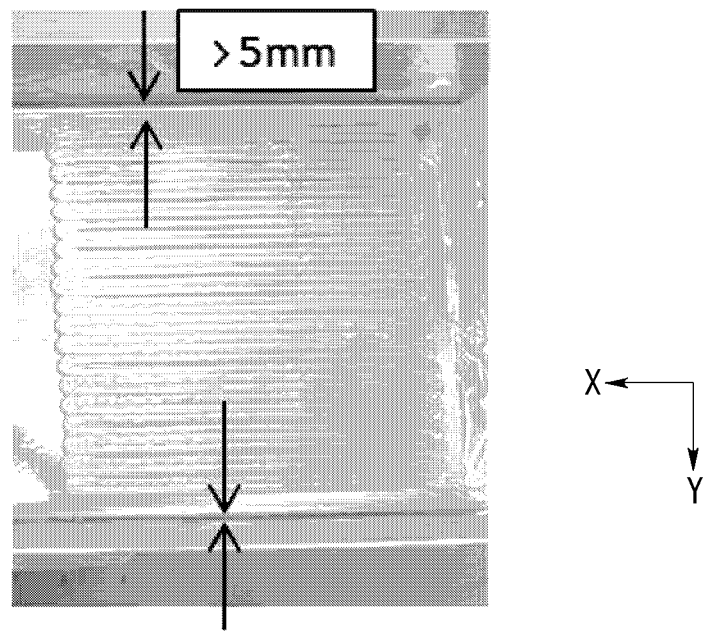
[FIG. 9]
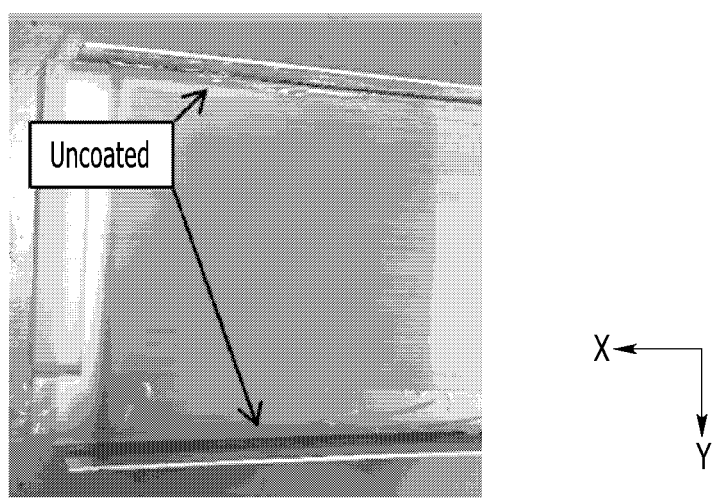

[FIG. 10]
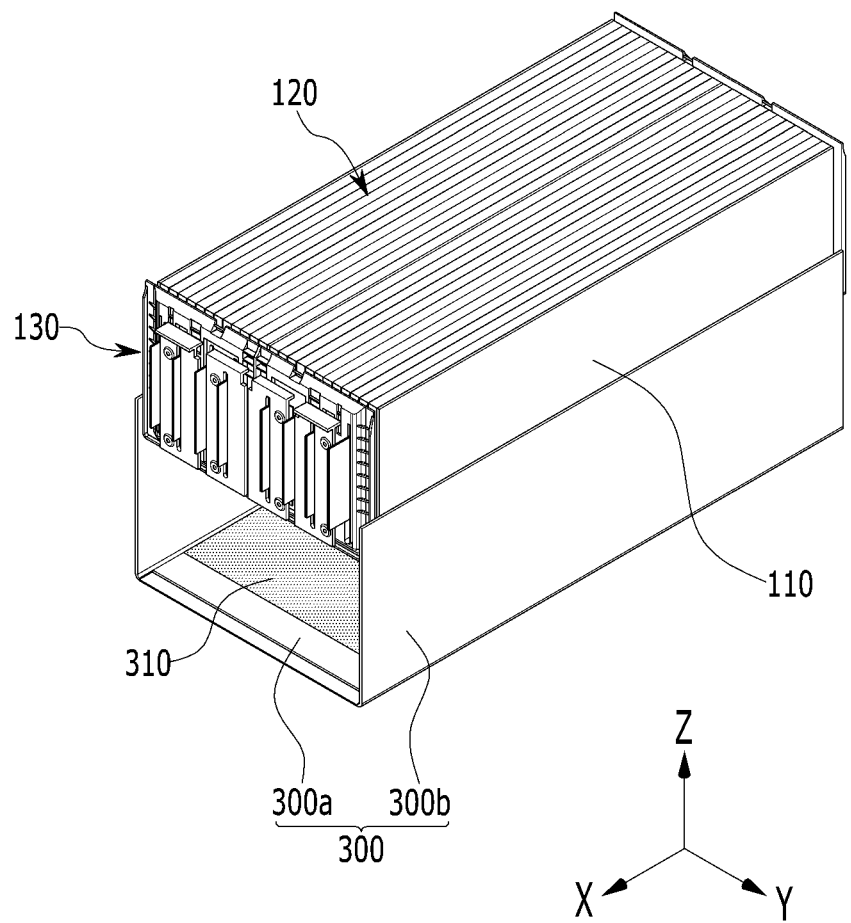

[FIG. 11]
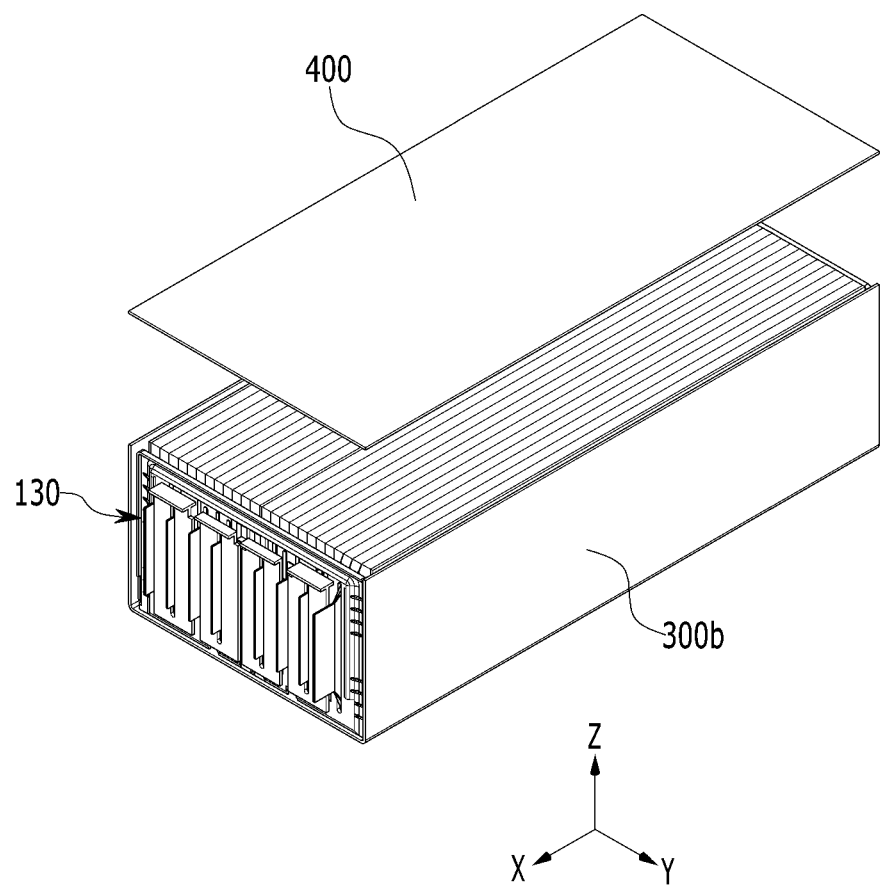

[FIG. 12]
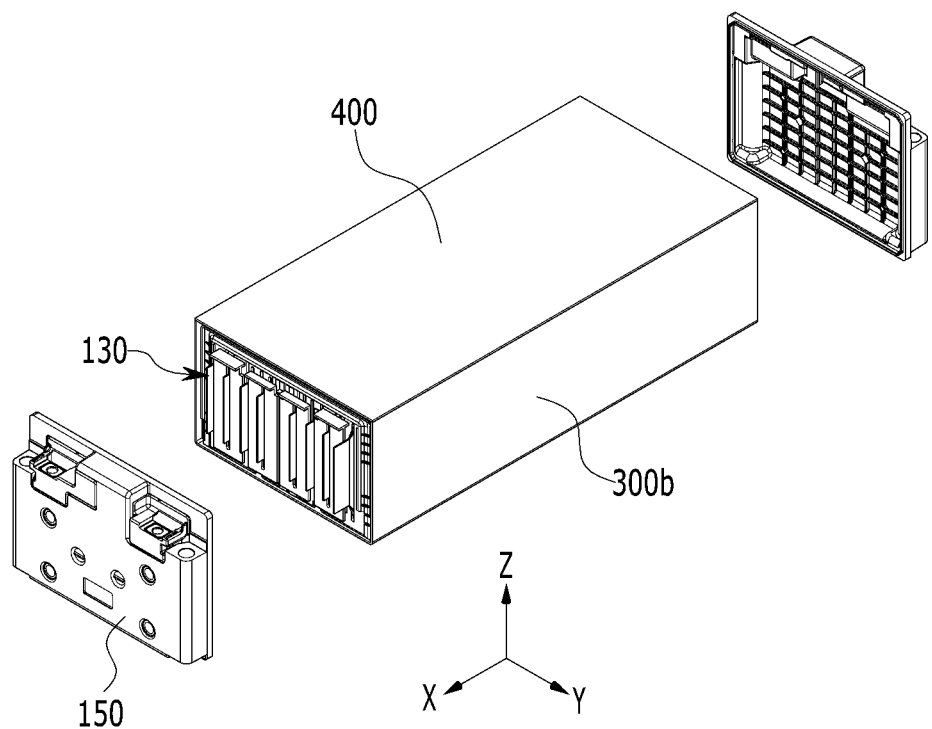

BATTERY MODULE, METHOD FOR MANUFACTURING THE SAME AND BATTERY PACK

CROSS-REFERENCE TO RELATED APPLICATIONS

This application is a national phase entry under 35 U.S.C. § 371 of International Application No. PCT/KR2020/016576, filed on Nov. 23, 2020, published in Korean, which claims priority to Korean Patent Application No. 10-2019-0152655, filed on Nov. 25, 2019, and Korean Patent Application No. 10-2020-0157074, filed on Nov. 20, 2020, the entire contents of which are hereby incorporated herein by reference.

TECHNICAL FIELD

The present disclosure relates to a battery module, a method for manufacturing the same, and a battery pack, and more particularly, to a battery module that improves the cooling performance, a method for manufacturing the same, and a battery pack.

BACKGROUND ART

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

The middle- or large-sized battery module is preferably manufactured so as to have as small a size and weight as possible. Consequently, a prismatic battery or a pouch-shaped battery, which can be stacked with high integration and has a small weight relative to capacity, is usually used as a battery cell of the middle- or large-sized battery module. Meanwhile, in order to protect the cell stack from external shock, heat, or vibration, the battery module may include a frame member whose front and back surfaces are opened so as to house the battery cell stack in an internal space.

When a secondary battery rises higher than an appropriate temperature, the secondary battery may undergo performance deterioration, and in the worst case, may explode or catch fire. In particular, in a battery module or a battery pack provided with a plurality of secondary batteries, that is, battery cells, the temperature may rise more quickly and drastically due to buildup of heat emitted from the plurality of battery cells in a small space. In other words, in the case of a battery module in which a plurality of battery cells is stacked and a battery pack equipped with such a battery module, high output can be obtained, but it is not easy to remove heat generated from the battery cells during charging and discharging. If the heat dissipation of the battery cell is not properly performed, the deterioration of the battery cell will be accelerated and the life will be shortened, and the possibility of explosion or ignition will increase.

Moreover, a battery module included in a vehicle battery pack is often exposed to direct sunlight and to be in a high-temperature condition such as the summer season or a desert region.

Therefore, when configuring a battery module or a battery pack, it may be very important to stably and effectively ensure the cooling performance. Thus, a heat dissipation layer may be formed in the battery module for discharging heat generated from the battery cell to the outside. The heat dissipation layer may be formed by coating a material having a heat dissipation function to a necessary part in the battery module. However, when coating the heat dissipation material, it cannot be coated onto a desired part due to structural reasons, or the coating amount may be excessively large, which may deteriorate the cooling performance.

DETAILED DESCRIPTION OF THE INVENTION

Technical Problem

An object of the present disclosure is to provide a battery module having a novel coating pattern of a heat dissipation material to improve the cooling performance, a method for manufacturing the same, and a battery pack.

However, the problem to be solved by embodiments of the present disclosure is not limited to the above-described problems, and can be variously expanded within the scope of the technical idea included in the present disclosure.

Technical Solution

A battery module according to one embodiment of the present disclosure includes: a battery cell stack in which a plurality of battery cells are stacked, a first frame member that houses the battery cell stack and has an opened upper part, a second frame member that covers the battery cell stack from an upper part of the first frame member, and a thermally conductive resin layer that is located between the first frame member and the battery cell stack, wherein the thermally conductive resin layer includes a plurality of coating lines extending long along a direction in which the plurality of battery cells are stacked.

The first frame member may be a U-shaped frame that houses the battery cell stack and has an opened upper part, the second frame member may be an upper plate that covers the battery cell stack from an opened upper part of the U-shaped frame, the U-shaped frame may include a bottom part and two side surface parts that are connected by the bottom part and face each other, the thermally conductive resin layer may be formed between the bottom part and the battery cell stack, and the plurality of coating lines may have a zigzag shape in which the two side surfaces are on both sides.

The end parts of the plurality of coating lines having the zigzag shape may be formed so as to be separated from any one of the two side surface parts.

The end parts of the plurality of coating lines may be located closer to the central part between the two side surface parts compared to the side surface parts.

Each of the plurality of coating lines may have the same length.

The direction in which the plurality of battery cells are stacked may be the same as the direction in which the two side surfaces face each other.

Both edge parts in the width direction of the thermally conductive resin layer may be adjacent to each of the two side surface parts, and recessed lines may be formed at the both edge parts of the thermally conductive resin layer, respectively.

The thermally conductive resin layer may be located in close contact with each of the two side surface parts.

The battery module may further include pad parts that are located at both ends of the bottom part of the U-shaped frame.

The battery module according to another embodiment of the present disclosure includes the above-mentioned battery pack.

A method for manufacturing a battery module according to another embodiment of the present disclosure comprises the steps of: coating a thermally conductive resin onto the bottom part of the first frame member with an opened upper part, mounting a battery cell stack on the bottom part of the first frame member, mounting a second frame member so as to cover the battery cell stack from the opened upper part of the first frame member, and coupling end plates to the opened front and rear surfaces of the first frame member, respectively, wherein the step of coating the thermally conductive resin includes a step of coating the thermally conductive resin in a reciprocating manner along the direction from the first side surface part to the second side surface part so as to form a zigzag-shaped coating pattern between the first side surface part and the second side surface part facing each other of the first frame member.

The step of coating the thermally conductive resin may form a plurality of coating lines extending long from the first side surface part to the second side surface part, and adjust so that a coating amount at both edges of the coating lines adjacent to each of the first side surface part and the second side surface part is larger than the coating amount at the central part of the coating line.

The step of coating the thermally conductive resin allows the distance between each edge of the coating line and the side surface part to be 5 millimeters or less.

The step of mounting a battery cell stack on the bottom part of the first frame member may include a step in which the battery cell stack presses the thermally conductive resin layer formed by coating the thermally conductive resin.

After the step in which the battery cell stack presses the thermally conductive resin layer, a width of the thermally conductive resin layer may be increased.

After the step in which the battery cell stack presses the thermally conductive resin layer, a recessed line may be formed in the part of the thermally conductive resin layer corresponding to an edge in the width direction of the battery cell stack.

After the step of coating the thermally conductive resin, the battery cell stack may have a waiting time of 10 minutes or less until the step of pressing the thermally conductive resin layer.

The step of coating the thermally conductive resin may form so that an end part of the zigzag-shaped coating pattern is located closer to a central part between the first side surface part and the second side surface part compared to the first side surface part or the second side surface part.

Advantageous Effects

According to the embodiments of the present disclosure, a heat dissipation material pattern can be formed in a zigzag shape along the direction in which a plurality of battery cells are stacked, thereby implementing the most optimized pattern for coating the entire desired area.

Also, the coating amount can be minimized/optimized by implementing the most optimized heat dissipation material pattern.

In addition, the heat dissipation material pattern can be coated onto the entire desired part, thereby improving the cooling performance of the battery module.

BRIEF DESCRIPTION OF THE DRAWINGS

FIG. 1 is an exploded perspective view showing a battery module according to one embodiment of the present disclosure.

FIG. 2 is a perspective view showing a state in which the components of the battery module of FIG. 1 are combined.

FIG. 3 is a perspective view showing one battery cell included in the battery cell stack of FIG. 1.

FIG. 4 is a perspective view showing a U-shaped frame in the battery module of FIG. 1.

FIG. 5 is a perspective view showing a U-shaped frame of the battery module according to a modified embodiment of FIG. 4.

FIG. 6 is a photograph showing the coating pattern of a thermal conductive resin before insertion of the battery cell stack according to one embodiment of the present disclosure.

FIG. 7 is a photograph showing the coating pattern of a thermal conductive resin after insertion of the battery cell stack according to one embodiment of the present disclosure.

FIG. 8 is a photograph showing the coating pattern of a thermal conductive resin before insertion of the battery cell stack according to the comparative example.

FIG. 9 is a photograph showing the coating pattern of a thermal conductive resin after insertion of the battery cell laminate according to the comparative example.

FIGS. 10 to 12 are views showing a method of manufacturing a battery module according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the drawings. In the figures, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference part, and does not necessarily mean being disposed on the upper end of the reference part toward the opposite direction of gravity.

Further, throughout the specification, when a part is referred to as "including" a certain component, it means that the part can further include other components, without excluding the other components, unless otherwise stated.

Further, throughout the specification, when referred to as "planar", it means when a target part is viewed from the upper side, and when referred to as "cross-sectional", it means when a target part is viewed from the side of a cross section cut vertically.

FIG. 1 is an exploded perspective view showing a battery module according to one embodiment of the present disclosure. FIG. 2 is a perspective view showing a state in which the components of the battery module of FIG. 1 are combined. FIG. 3 is a perspective view showing one battery cell included in the battery cell stack of FIG. 1.

Referring to FIGS. 1 and 2, a battery module 100 according to the present disclosure includes: a battery cell stack 120 including a plurality of battery cells 110, a U-shaped frame 300 whose upper, front and rear surfaces are opened, an upper plate 400 for covering an upper part of the battery cell stack 120, end plates 150 located at the front and rear surfaces of the battery cell stack 120, respectively, and a busbar frame 130 located between the battery cell stack 120 and the end plate 150. Further, the battery module 100 includes a thermally conductive resin layer 310 located between the U-shaped frame 300 and the battery cell stack 120. The thermally conductive resin layer 310 is a type of heat dissipation layer, and may be formed by coating a material having a heat dissipation function.

When both open sides of the U-shaped frame 300 are referred to as the first side and the second side, respectively, the U-shaped frame 300 is composed of a plate-shaped structure that is bent so as to continuously cover the front, lower and rear surfaces adjacent to each other, among the remaining outer surfaces excluding the surfaces of the battery cell stack 120 corresponding to the first side and the second side. The upper surface corresponding to the lower surface of the U-shaped frame 300 is opened.

The upper plate 400 has a single plate-shaped structure that wraps the remaining upper surface excluding the front, lower and rear surfaces wrapped by the U-shaped frame 300. The U-shaped frame 300 and the upper plate 400 may form a structure that wraps the battery cell stack 120 by being coupled by welding or the like in a state in which the corresponding corner parts are in contact with each other. That is, the U-shaped frame 300 and the upper plate 400 may have a coupling part CP formed at an edge part corresponding to each other by a coupling method such as welding.

The battery cell stack 120 includes a plurality of battery cells 110 stacked in one direction, and the plurality of battery cells 110 may be stacked in the Y-axis direction as shown in FIG. 1. In other words, the direction in which the plurality of battery cells 110 are stacked may be the same as the direction in which the two side surface parts of the U-shaped frame 300 face each other.

The battery cell 110 is preferably a pouch-type battery cell. For example, referring to FIG. 3, the battery cell 110 according to this embodiment has a structure in which the two electrode leads 111 and 112 face each other and protrude from one end part 114a and the other end part 114b of the battery body 113, respectively. The battery cell 110 can be manufactured by adhering both end parts 114a and 114b of the battery case 114 and both side surfaces 114c connecting them in a state in which the electrode assembly (not shown) is housed in the battery case 114. In other words, the battery cell 110 according to this embodiment has a total of three sealing parts 114sa, 114sb and 114sc, the sealing parts 114sa, 114sb and 114sc has a structure that is sealed by a method such as heat fusion, and the other side surface part may be formed of the connecting part 115. Between both end parts 114a and 114b of the battery case 114 are defined as the longitudinal direction of the battery cell 110, and between the one side surface part 114c and the connecting part 115 that connect the both end parts 114a and 114b of the battery case 114 may be defined as the width direction of the battery cell 110.

The connecting part 115 is an area that extends long along one edge of the battery cell 110, and a protruding part 110p of the battery cell 110 may be formed at an end of the connecting part 115. The protruding part 110p may be formed on at least one of both ends of the connecting part 115, and can protrude in a direction perpendicular to the direction in which the connecting part 115 extends. The protruding part 110p may be located between one of the sealing parts 114sa and 114sb of both ends 114a and 114b of the battery case 114 and the connecting part 115.

The battery case 114 may be generally composed of a laminate structure of a resin layer/metal thin film layer/resin layer. For example, in case where the surface of the battery case is made of an O (oriented)-nylon layer, when a plurality of battery cells are stacked to form a medium- or large-sized battery module, they tend to slip easily due to external impact. Therefore, in order to prevent this and maintain a stable stacked structure of battery cells, an adhesive member, such as, for example, a tacky type adhesive such as a double-sided tape or a chemical adhesive adhered by a chemical reaction during adhesion, can be adhered to the surface of the battery case to form the battery cell stack 120. In this embodiment, the battery cell stack 120 can be stacked in the Y-axis direction, housed in the U-shaped frame 300 in the Z-axis direction, and cooled by a thermally conductive resin layer described later. As a comparative example, the battery cells may be formed of cartridge-shaped components, and the fixation between the battery cells may be made by assembling the battery module frame. In this comparative example, due to the presence of the cartridge-type components, there is little cooling action or it may proceed in the surface direction of the battery cell, and cooling is not well performed in the height direction of the battery module.

FIG. 4 is a perspective view showing a U-shaped frame in the battery module of FIG. 1.

Referring to FIG. 4, the U-shaped frame 300 according to this embodiment includes a bottom part 300a and two side surface parts 300b facing each other. Before the battery cell stack 120 shown in FIG. 1 is mounted on the bottom part 300a of the U-shaped frame 300, a thermally conductive resin can be coated onto the bottom part 300a of the U-shaped frame 300 and the thermally conductive resin can be cured to form the thermally conductive resin layer 310.

Before forming the thermally conductive resin layer 310, that is, before the coated thermally conductive resin is cured, the battery cell stack 120 may be mounted on the bottom part 300a of the U-shaped frame 300 while moving along the direction perpendicular to the bottom part 300a of the U-shaped frame 300. Thereafter, the thermally conductive resin layer 310 formed by curing the thermally conductive resin is located between the bottom part 300a of the U-shaped frame 300 and the battery cell stack 120. The thermally conductive resin layer 310 can serve to transfer heat generated from the battery cell 110 to the bottom of the battery module 100 and fix the battery cell stack 120.

The battery module according to this embodiment may further include a pad part 320 that is formed on the bottom part 300a of the U-shaped frame 300. The pad part 320 may guide the coating position of the thermally conductive resin or prevent the thermally conductive resin from overflowing to the outside of the bottom part 300a, and at least one pad part may be formed. In FIG. 4, it is shown that one pad part 320 is formed at each end of the bottom part 300a on the basis of the X-axis direction, but in consideration of the coating amount of the thermally conductive resin, the size, position, and number of the pad part 320 may be modified and designed. The pad part 320 may be formed of an insulating film. At this time, the pad part 320 may be formed of a material such as polyurethane foam (PU foam) or rubber so that the battery cell is compressed by being in contact with the upper part of the bottom part and the heat conductive resin.

According to this embodiment, the thermally conductive resin layer 310 includes a plurality of coating lines 315 that extends long along the direction in which the plurality of battery cells 110 are stacked. The plurality of coating lines 315 have a zigzag shape having two side surface parts 300b on both sides. As shown in FIG. 4, the plurality of coating lines 315 can reciprocate in zigzag along the Y-axis direction. The plurality of coating lines 315 includes a first coating line 315a and a second coating line 315b, and an insulating film 330 may be formed between the first coating line 315a and the second coating line 315b. Each of the plurality of coating lines 315 may have substantially the same length along the Y-axis direction. A part to which the thermally conductive resin is not coated may be formed between the first coating line 315a and the second coating line 315b, and in this part, the insulation between the battery cell 110 and the U-shaped frame 300 may become weak. Therefore, the insulating film 330 may be applied to secure the insulating properties of a part to which the thermally conductive resin is not coated.

In this embodiment, both edge parts in the width direction (Y-axis direction) of the thermally conductive resin layer 310 are adjacent to each of the two side surface parts 300b, and recessed lines may be formed at both edge parts of the thermally conductive resin layer 310. When the battery cell stack 120 presses the thermally conductive resin layer 310, the recessed line 340 coincides with an edge of the battery cell stack 120 in the Y-axis direction and can extend in the X-axis direction. The distance between the recessed line 340 and the side surface part 300b is about 5 millimeters or less. Preferably, the distance between the recessed line 340 and the side surface part 300b is about 3 millimeters or less, more preferably about 1.5 millimeters or less. In this case, the thermally conductive resin layer 310 may be located in close contact with each of the two side surface parts 300b.

Referring to FIGS. 1 and 2 again, the widths of the side surface portion 300b and the upper plate 400 of the U-shaped frame 300 according to this embodiment may be the same. In other words, the edge part along the X-axis direction of the upper plate 400 and the edge part along the X-axis direction of the side part 300b of the U-shaped frame 300 can directly meet and be coupled by a method such as welding.

FIG. 5 is a perspective view showing a U-shaped frame of the battery module according to a modified embodiment of FIG. 4.

The embodiment of FIG. 5 is mostly the same as the embodiment of FIG. 4 described above, and in the following, only the parts that differ will be explained.

Referring to FIG. 5, the thermally conductive resin layer 310 includes a plurality of coating lines 315 that extends long along the Y-axis direction. The plurality of coating lines 315 may reciprocate in zigzag along the Y-axis direction. The plurality of coating lines 315 includes a first coating line 315a and a second coating line 315b, and an insulating film 330 may be formed between the first coating line 315a and the second coating line 315b.

The end parts 315T of the plurality of coating lines 315 having a zigzag shape according to this embodiment may be formed so as to be separated from any one of the two side surface parts 300b. In order to form the thermally conductive resin layer 300, the end part 315T of the coating line 315 refers to a point where coating is completed after the heat conductive resin is reciprocally coated in a zigzag shape between the first side portion 300b1 and the second side portion 300b2 facing each other of the U-shaped frame. The end part 315T of the plurality of coating lines may be located closer to a central part between the two side surface parts compared to the side surface parts 300b.

In addition to the differences described above, all the contents described in FIG. 4 can be applied to the embodiment of FIG. 5.

The U-shaped frame described herein can have a configuration corresponding to the frame member. For example, the U-shaped frame may correspond to the first frame member, and the upper plate may correspond to the second frame member.

Hereinafter, one example of a method of manufacturing the battery module according to the embodiment of the present disclosure described above will be described.

FIG. 6 is a photograph showing the coating pattern of a thermal conductive resin before insertion of the battery cell stack according to one embodiment of the present disclosure. FIG. 7 is a photograph showing the coating pattern of a thermal conductive resin after insertion of the battery cell stack according to one embodiment of the present disclosure. FIG. 8 is a photograph showing the coating pattern of a thermal conductive resin before insertion of the battery cell stack according to the comparative example. FIG. 9 is a photograph showing the coating pattern of a thermal conductive resin after insertion of the battery cell laminate according to the comparative example.

FIGS. 10 to 12 are views showing a method of manufacturing a battery module according to another embodiment of the present disclosure.

First, referring to FIG. 6, the method of manufacturing the battery module according to this embodiment includes a step of coating a thermally conductive resin 310p onto the bottom part 300a of the U-shaped frame 300 corresponding to the first frame member having an opened upper part. The thermally conductive resin 310p may be then cured to form the thermally conductive resin layer 310 shown in FIG. 4. The step of coating the thermally conductive resin 310p includes a step of coating the thermally conductive resin 310b in a reciprocating manner along the direction from the first side surface part 300b1 to the second side surface part 300b2 so as to form a zigzag-shaped coating pattern between the first side surface part 300b1 and the second side surface part 300b2 facing each other of the U-shaped frame 300. In other words, as shown in FIG. 6, the coating direction of the thermally conductive resin 310p may have a zigzag shape along the Y-axis direction.

According to this embodiment, the step of coating the thermally conductive resin 310 can form a plurality of coating lines 315 extending long from the first side surface part 300b1 to the second side surface part 300b2, and adjusts so that the coating amount at both edges of the coating lines 315 adjacent to each of the first side surface part 300b1 and the second side surface part 300b2 is larger than the coating amount at a central part of the coating line 315. For this purpose, when forming a zigzag-shaped coating pattern, the speed or the time retention degree of the portion where the zigzag direction is curved can be adjusted. In this case, a distance between each of both edges of the plurality of coating lines 315 extending long from the first side surface part 300b1 to the second side surface part 300b2, and the side surface part 300b may be about 5 millimeters or less. Preferably, the distance between each of both edges of the plurality of coating lines 315 and the side surface part 300b is about 3 millimeters or less, more preferably about 1.5 millimeters or less. In this case, the thermally conductive resin layer 310 may be located in close contact with each of the two side surface parts 300b.

According to the embodiment of the present disclosure, a point at which coating of the thermally conductive resin is completed may be set so that the end parts 315T of the zigzag-shaped coating lines 315 are separated from any one of the two side surface parts 300b, as described in FIG. 5. In this case, the end parts 315T of the plurality of coating lines may be formed so as to be located closer to the central part between the two side surface parts compared to the side surface parts 300b. In addition, it is possible to reduce the dispensing time of the thermally conductive resin at the end part 315T of the coating line compared to the dispensing time of the thermally conductive resin when coating in a reciprocating manner.

By controlling the formation position of the end part 315T of the coating line and/or the dispensing time of the thermally conductive resin in this way, it is possible to prevent excessive accumulation of the thermally conductive resin at the end part 315T of the coating lines. Accordingly, when the battery cell stack is inserted after coating the thermally conductive resin, it is possible to prevent the left and right heights of the terminal busbar included in the battery module from being changed by being slantly inserted in the Y-axis direction, which is the width direction.

Before the step of coating the thermally conductive resin 310p, the method may further include a step of forming the pad part 320 shown in FIG. 4 on the bottom part 300a of the U-shaped frame 300. Referring to FIGS. 4 and 10, when the thermally conductive resin is coated between the pad parts 320, the pad parts 320 can not only guide the coating position of the thermally conductive resin, but also prevent the thermally conductive resin from overflowing, and easily adjust the coating amount of the thermally conductive resin.

Next, referring to FIG. 10, the method for manufacturing the battery module according to the embodiment of the present disclosure includes a step of mounting the battery cell stack 120 on the bottom part 300a of the U-shaped frame 300 having an opened upper part. At this time, it is preferable that the battery cell stack 120 is inserted into the bottom part 300a of the U-shaped frame 300 in the direction perpendicular to the stacking direction (Z-axis direction) of the plurality of battery cells 100 included in the battery cell stack 120.

Referring to FIGS. 6 and 10, the step of mounting the battery cell stack 120 on the bottom part 300a of the U-shaped frame 300 may include a step in which the battery cell stack 120 presses the thermally conductive resin layer 310 formed by coating the thermally conductive resin 310p. At this time, assuming that the width in the Y-axis direction of the thermally conductive resin layer 310 is the first width, the width of the thermally conductive resin layer 310 in the Y-axis direction increases compared to the first width, after the step in which the battery cell stack 120 presses the thermally conductive resin layer 310. This is because by inserting and pressing the battery cell stack 120 into the bottom part 300a of the U-shaped frame 300, a phenomenon occurs in which the thermally conductive resin 310p spreads to the first and second side surface parts 300b1 and 300b2.

Referring to FIGS. 4, 6 and 10, after the battery cell stack 120 presses the thermally conductive resin layer 310, a recessed line 340 can be formed at the edge part of the thermally conductive resin layer 310 before pressing the thermally conductive resin layer 310. The recessed line 340 may be formed by a force pressing the thermally conductive resin layer 310 on the battery cell stack 120. The height of the thermally conductive resin 310p diffused to the first and second side surface parts 300b1 and 300b2 on the basis of the recessed line 340 may be higher than the height of the thermally conductive resin 310p pressed by the battery cell stack 120.

According to this embodiment of the present disclosure, after the step of coating the thermally conductive resin 310p, the battery cell stack 120 may have a waiting time of 10 minutes or less until the step of pressing the thermally conductive resin layer 310. When the waiting time has the above range, the thermally conductive resin 310p spreads up to the first and second side surface parts 300b1 and 300b2 by pressing the battery cell stack 120, so that the distance between the first and second side surface parts 300b1 and 300b2 and the thermally conductive resin layer 310 may become about 1.5 mm or less. In case where the above range is not satisfied, even if the thermally conductive resin 310p spreads up to the first and second side surface parts 300b1 and 300b2 at the maximum, the minimum distance between the first and second side surface parts 300b1 and 300b2 and the thermally conductive resin layer 310 is at a level of about 2.5 millimeters, and thus the desired specification cannot be satisfied.

Referring to FIG. 7, it can be confirmed that as a thermally conductive resin 310p is coated in a zigzag shape along a direction in which a plurality of battery cells are stacked by the method of manufacturing a battery module according to this embodiment, the thermally conductive resin 310p is coated up to the first and second side surface parts 300b1 and 300b2 after the battery cell stack 120 is pressed. Therefore, the cooling performance of the battery module can be improved by coating the heat dissipation material onto the entire desired portion. Further, by implementing the most optimized heat dissipation material pattern, the coating amount can be minimized/optimized.

Unlike the method for manufacturing the battery module according to one embodiment of the present disclosure described above, in the comparative examples of FIGS. 8 and 9, the thermally conductive resin 310p can be coated in a zigzag shape along the direction perpendicular to the direction in which a plurality of battery cells are stacked. In other words, as shown in FIG. 8, the coating direction of the thermally conductive resin 310p can have a zigzag shape along the X-axis direction. According to this, as shown in FIG. 9, after the battery cell stack 120 is pressed, the thermally conductive resin 310p is not diffused up to the first and second side surface parts 300b1 and 300b2, so that an uncoated area is formed. Specifically, since the minimum distance between the first and second side surface parts and the thermally conductive resin layer exceeds about 5 millimeters, the desired specification cannot be satisfied. In addition, when moving the nozzle for coating the thermally conductive resin along the X-axis direction, since the time when the interference with the side surface part of the U-shaped frame occurs is greatly increased compared to this embodiment, it is difficult to form the coating pattern of the desired specification, and in order to actually satisfy the specifications, the coating amount can be significantly increased. Further, an empty space may be created between the coating lines, and when a long empty space is formed along the X-axis direction, the empty space may actually correspond to a specific battery cell, which may result in a cell defect. Here, the cell defect can include a case where the cooling effect of a specific battery cell decreases and the lifespan is shortened.

The method for manufacturing the battery module according to the embodiment of the present disclosure may further include a step of connecting the battery cell stack 120 and the bus bar frame 130 while moving the bus bar frame 130 in a direction opposite to the direction in which the electrode leads of the battery cells 110 included in the battery cell stack 120 is protruded, before mounting the battery cell stack 120 on the bottom part 300a of the U-shaped frame 300.

Referring to FIG. 11, the method for manufacturing the battery module according to this embodiment includes a step of mounting the upper plate 400 so as to cover the battery cell stack 120 at the upper part of the opened U-shaped frame 300.

Referring to FIG. 12, the method for manufacturing the battery module according to this embodiment includes the steps of: coupling the upper plate 400 and the side surface part 300b of the U-shaped frame, and coupling the end plates 150 to each of both open sides of the U-shaped frame. In order to couple the upper plate 400 and the side surface part 300b of the U-shaped frame, welding process, bonding process using adhesives, bolting coupling process, riveting and tape coupling process, and the like can be used.

Meanwhile, one or more battery modules according to the embodiment of the present disclosure can be packaged in a pack case to form a battery pack.

The above-mentioned battery module and a battery pack including the same may be applied to various devices. These devices can be applied to transportation means such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
300: U-shaped frame
310: thermally conductive resin layer
320: pad part
340: recessed line
315: coating line
315T: end part of coating line

The invention claimed is:

1. A battery module comprising:
   a battery cell stack in which a plurality of battery cells are stacked,
   a first frame member that houses the battery cell stack and has an open upper part,
   a second frame member that covers the battery cell stack at the open upper part of the first frame member, and
   a thermally conductive resin layer that is located between the first frame member and the battery cell stack,
   wherein the first frame member includes a bottom part and two side surface parts that are connected by the bottom part and face each other,
   wherein the thermally conductive resin layer is located between the bottom part and the battery cell stack, and
   wherein the thermally conductive resin layer includes a plurality of coating lines formed by reciprocally and continuously coating along the direction in which the two side parts face each other.

2. The battery module according to claim 1,
   wherein the first frame member is a U-shaped frame,
   the second frame member is an upper plate,
   the plurality of coating lines each have a zigzag shape and are disposed between the two side surface parts.

3. The battery module according to claim 2, wherein an end part of each of the plurality of coating lines is separated from each of the two side surface parts.

4. The battery module according to claim 3, wherein the end part of each of the plurality of coating lines is located closer to a central part of the bottom part between the two side surface parts than to the side surface parts.

5. The battery module according to claim 1, wherein each of the plurality of coating lines has a same length.

6. The battery module according to claim 1, wherein the direction in which the plurality of battery cells are stacked is the same as a direction in which the two side surface parts face each other.

7. The battery module according to claim 1, wherein first and second edge parts in a width direction of the thermally conductive resin layer are adjacent to respective ones of the two side surface parts, and first and second recessed lines are formed at the first and second edge parts of the thermally conductive resin layer, respectively.

8. The battery module according to claim 1, wherein first and second edge parts of the thermally conductive resin layer are located in close contact with respective ones of the two side surface parts.

9. The battery module according to claim 2, further comprising pad parts that are located at opposite ends of the bottom part of the U-shaped frame, the thermally conductive resin layer being disposed on the pad parts.

10. A method for manufacturing a battery module, comprising the steps of:
    coating a thermally conductive resin onto a bottom part of a first frame member having an open upper part,
    mounting a battery cell stack on the bottom part of the first frame member, such that the thermally conductive resin layer is located between the bottom part and the battery cell stack,
    mounting a second frame member covering the battery cell stack at the open upper part of the first frame member, and
    coupling first and second end plates to open front and rear surfaces of the first frame member, respectively,
    wherein the coating of the thermally conductive resin includes coating the thermally conductive resin in a reciprocating and continuous manner along a direction from a first side surface part of the first frame member to a second side surface part of the first frame member that faces the first side surface part so as to form a zigzag-shaped coating pattern between the first side surface part and the second side surface part.

11. The method for manufacturing a battery module according to claim 10, wherein the coating of the thermally conductive resin forms a plurality of coating lines extending from the first side surface part to the second side surface part, and adjusts so that a coating amount at opposite edges of the coating lines adjacent to the first side surface part and the second side surface part, respectively, is larger than a coating amount at a central part of the plurality of coating lines.

12. The method for manufacturing a battery module according to claim 11, wherein a distance between each of the opposite edges of the coating line and the respective side surface part is 5 millimeters or less.

13. The method for manufacturing a battery module according to claim 11, wherein the mounting of the battery cell stack on the bottom part of the first frame member includes the battery cell stack pressing a thermally conductive resin layer formed by the coating of the thermally conductive resin.

14. The method for manufacturing a battery module according to claim 13, wherein after the battery cell stack presses the thermally conductive resin layer, a width of the thermally conductive resin layer is increased.

15. The method for manufacturing a battery module according to claim 14, wherein after the battery cell stack presses the thermally conductive resin layer, a recessed line is formed in an edge part of the thermally conductive resin layer, the edge part being adjacent to an edge of the thermally conductive resin layer in a width direction of the battery cell stack.

16. The method for manufacturing a battery module according to claim 13, wherein the battery cell stack pressing the thermally conductive resin layer is performed 10 minutes or less after the coating of the thermally conductive resin.

17. The method for manufacturing a battery module according to claim 10, wherein an end part of the zigzag-shaped coating pattern is located closer to a central part of the bottom part of the first frame member between the first side surface part and the second side surface part than to the first side surface part or the second side surface part.

18. A battery pack comprising the battery module according to claim 1.

19. The battery module according to claim 1, wherein the plurality of coating lines includes a first coating line and a second coating line, the battery module further comprising an insulating film disposed on the bottom part of the first frame member between the first coating line and the second coating line.

20. The method for manufacturing a battery module according to claim 10, wherein the coating of the thermally conductive resin includes forming a first coating line and a second coating line of the thermally conductive resin, the method further comprising forming an insulating film on the bottom part of the first frame member between the first coating line and the second coating line.

* * * * *